United States Patent [19]
Audren

[11] Patent Number: 6,082,672
[45] Date of Patent: Jul. 4, 2000

[54] ACTUATOR FOR AN AIRCRAFT FLIGHT CONTROL SURFACE

[75] Inventor: Jean Thierry Audren, St. Rémy les Chevreuse, France

[73] Assignee: SFIM Industries, Massy, France

[21] Appl. No.: 09/207,032

[22] Filed: Dec. 8, 1998

[30] Foreign Application Priority Data

Dec. 8, 1997 [FR] France ................... 97-15480

[51] Int. Cl.⁷ .................................. B64C 13/24
[52] U.S. Cl. ................. 244/75 R; 244/228; 310/323.03; 310/328
[58] Field of Search ................ 244/75 R, 228, 244/76 R, 178, 177; 310/328, 331, 330, 323.03

[56] References Cited

U.S. PATENT DOCUMENTS

| | | | |
|---|---|---|---|
| 3,021,097 | 2/1962 | Hecht | 244/178 |
| 3,023,985 | 3/1962 | Hong et al. | 244/178 |
| 5,001,382 | 3/1991 | Umeda et al. | 310/328 |
| 5,626,312 | 5/1997 | Head | 244/75 R |
| 5,786,653 | 7/1998 | Culp | 310/323.03 |
| 5,907,211 | 3/1999 | Hall et al. | 310/328 |
| 5,912,525 | 6/1999 | Kobayashi et al. | 310/328 |
| 5,986,385 | 11/1999 | Atsuta | 310/323.03 |

FOREIGN PATENT DOCUMENTS 0 089 177  9/1983  European Pat. Off. .

OTHER PUBLICATIONS

Chopra, I, "Development of a Smart Rotor", Proceedings of the European Rotorcraft Forum, Cernobbio, Italy, Sep. 14–16, 1993 vol. 2, No. Forum 19, Sep. 14, 1993, pp. N6–00–N6–18.

L'Usine Nouvelle, No. 2568, Oct. 31, 1996, pp. 52–53.

Air & Cosmos/Aviation International, vol. 1602, Feb. 28, 1997, pp. 20–21.

*Primary Examiner*—Galen L. Barefoot
*Attorney, Agent, or Firm*—Jacobson, Price, Holman & Stern, PLLC

[57] ABSTRACT

An actuator for a primary control surface of an air-craft, the actuator comprising at least one motor of the vibration type mounted in series with at least a second motor which is a piezoelectric, electrostrictive, or magnetostrictive actuator of the direct type, and further including control means causing one or both of the motors to operate in such a manner that the second motor drives movements of the control surface of the type used for stabilizing the aircraft, while the vibration drives movements of greater amplitude.

7 Claims, 3 Drawing Sheets

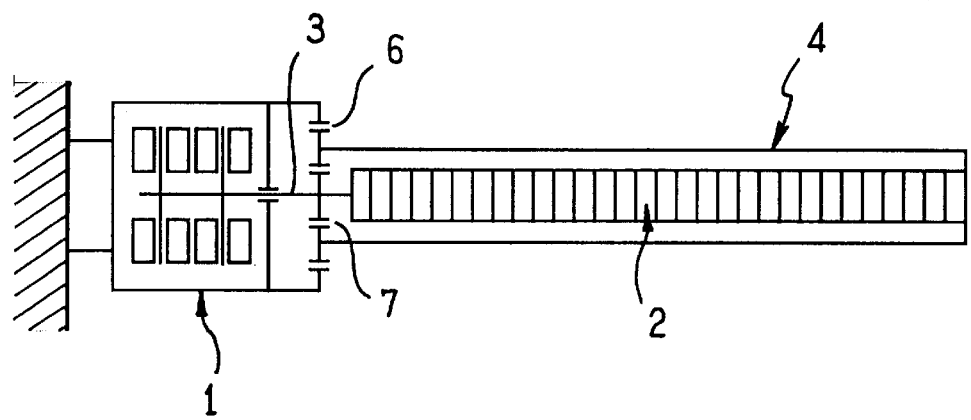
FIG_1
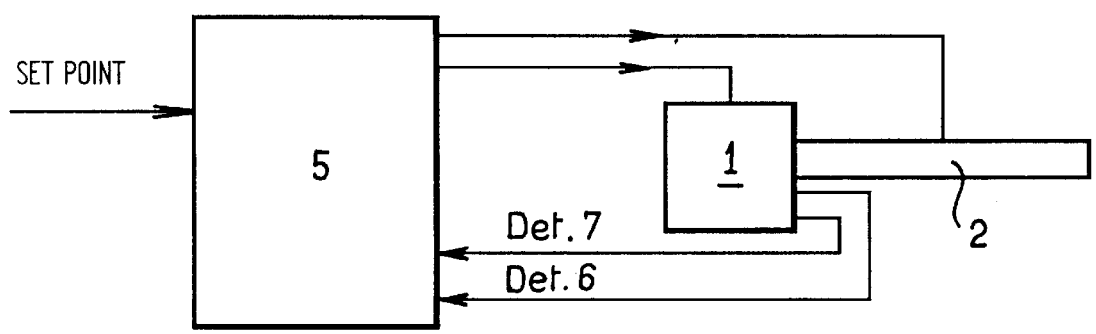
FIG_2

ACTUATOR FOR AN AIRCRAFT FLIGHT CONTROL SURFACE

The present invention relates to actuators for air-craft flight control surfaces.

BACKGROUND OF THE INVENTION

Two types of flight control exist on board aircraft:

primary controls which serve to control immediate movements; on an airplane these are generally flat surfaces situated in the trailing edges of the wings;

secondary flight controls which serve to adjust the aerodynamic configuration of the aircraft to various stages of flight; this category includes wing slats and landing flaps and the rear tail plane.

In general, primary and secondary flight controls are implemented using hydraulic devices.

However, for various reasons (maintenance, pollution, fire risk, etc. . . . ), aircraft manufacturers are seeking to reduce the amount of hydraulics in control systems in favor of electrical controls.

An object of the invention is to propose a primary flight control of the electrical type.

Proposals have already been made for secondary flight controls to implement actuators by means of "vibration" motors, in which tangential and normal vibrations generated on a stator are transformed into continuous movement by the friction of the mechanical contact between said stator and the rotor.

For a general description of the use of that type of motor for secondary flight controls, reference can be made for example to the following:

"Actionneurs—Des matériaux piézoélectriques pour les commandes du future" [Actuators—piezoelectric materials for future controls], Usine nouvelle, Oct. 31, 1996, No. 2568; and "Des commands de vol piézoélectriques" [Piezo-electric flight controls], Air et Cosmos/Aviation International, No. 1602, Feb. 28, 1997.

It is known that primary controls must be capable of performing two types of movement:

continuous movements of small amplitude necessary for short-term piloting of an airplane (stabilization); these movements have a frequency spectrum that extends beyond the spectrum applicable to movements of the air-plane; and large-amplitude movements, that are much less frequent than the continuous movements and that are thus of very small spectrum width; these movements correspond to initializing major maneuvers of an aircraft, for example on an airplane, banking as is necessary for turning.

Vibration motors could constitute advantageous candidates for primary controls since they are suitable for presenting high energy densities, they are capable of withstanding high stresses, and they are capable of performing large-amplitude movements.

Nevertheless, with this type of motor, continuous movements of small amplitude lead to very rapid wear at the interface, such that these motors are of limited lifetime.

For secondary controls, proposals have already been made to use actuators that implement directly the displacement of piezoelectric, electrostrictive, or magnetostrictive materials, possibly with amplification, in order to achieve small-amplitude movement of the control surface.

Direct actuator structures of that type are described, for example in:

"A new amplifier piezoelectric actuator for precise positioning and semi-passive damping", R. Le Letty, F. Claeyssen, G. Thomin, 2nd Space Microdynamics and Accurate Control Symposium, May 13–16, 1997, Toulouse.

Nevertheless, even when amplified, such actuators do not provide amplitudes that are sufficient for primary flight controls.

OBJECT AND SUMMARY OF THE INVENTION

The invention proposes an actuator for a primary control surface of an aircraft, the actuator comprising at least one motor of the vibration type mounted in series with at least a second motor which is a piezoelectric, electrostrictive, or magnetostrictive actuator of the direct type, and further including control means causing one or both of the motors to operate in such a manner that the second motor drives movements of the control surface of the type used for stabilizing the aircraft, while the vibration drives movements of greater amplitude.

With such an actuator, the advantages of vibration motors which enable large-amplitude movements to be performed are combined with the advantages of direct actuators which make it possible to provide long lifetime.

Advantageously, the actuator further includes the various characteristics below taken singly or in any technically feasible combination:

the control means comprise an electronic circuit controlling both of the motors as a function firstly of an external set point signal and secondly of signals output by two detectors, one providing information concerning the position of the control surface, and the other providing information concerning the relative angular position between the outlets of the two motors mounted in series;

the motor is an actuator of the direct type and is controlled by a servo-control loop designed to maintain the position of the control surface on the flight set point;

the control means apply speed control to the vibration motor as a function of the relative angle between the outlets of the two motors and in application of a non-linear control law;

the control law is such that:
  the vibration motor is not caused to rotate so long as said relative angle is less than a given threshold;
  the motor is caused to rotate at a given speed when the absolute value of said relative angle exceeds the threshold; and
  rotation of the motor is stopped when said relative angle becomes zero;

the actuator further includes filter means at the outlet of the non-linear control; and the actuator comprises a plurality of vibration motors and a plurality of direct type motors in series.

BRIEF DESCRIPTION OF THE DRAWINGS

Other characteristics and advantages appear further from the following description. The description is purely illustrative and non-limiting. It should be read with reference to the accompanying drawings, in which:

FIG. 1 is a diagram of an actuator constituting one possible embodiment of the invention;

FIG. 2 is a diagram showing the structure of the control means for the FIG. 1 actuator;

MORE DETAILED DESCRIPTION

Figure 3:
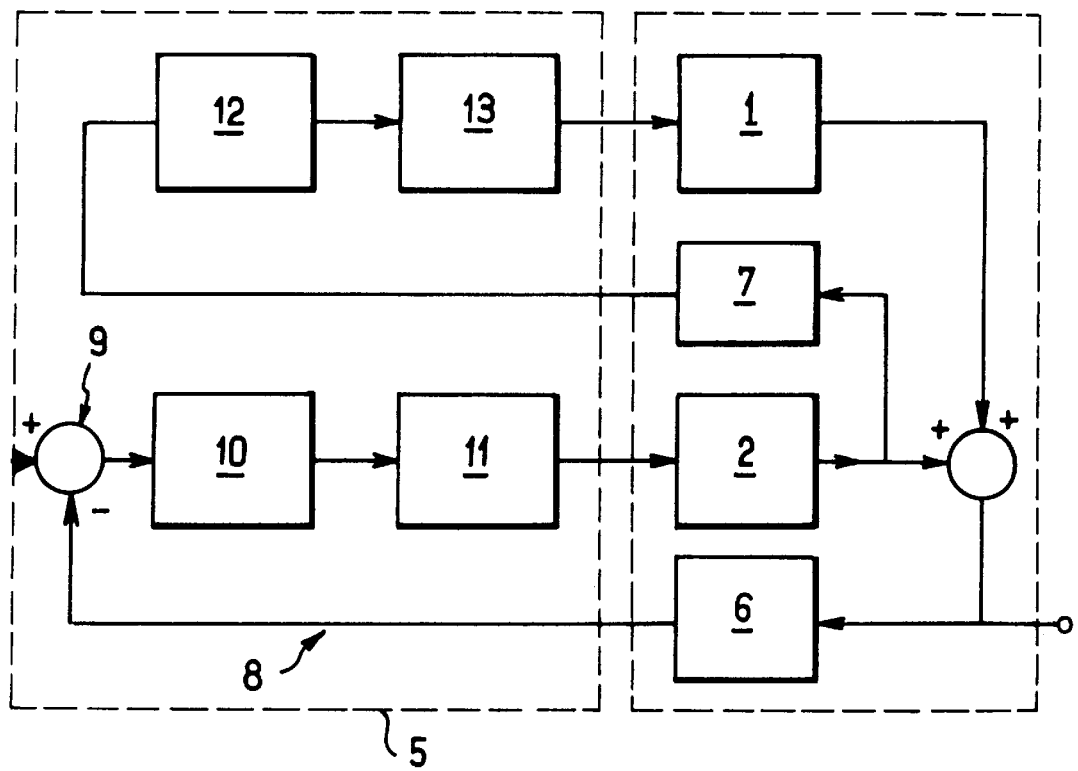
FIG. 3 is a block diagram of the control means.

The actuator shown in FIG. 1 comprises firstly a motor 1 which is of the vibration type and makes large-amplitude movements possible, and secondly a motor 2 which is a piezoelectric, electrostrictive, or magnetostrictive actuator of the direct type and which provides movements of small amplitude.

These two motors 1 and 2 are mounted in series. More particularly, the motor 2 is mounted on a shaft 3 driven by the motor 1. The motor 2 itself drives an attachment structure 4 on which the control surface actuated by said motors 1 and 2 is mounted.

By way of example, the vibration motor 1 is of the type described in the Applicants' French patent application published under the No. 2 742 011 or in their French patent application filed under the No. 97/10948.

By way of example, the motor 2 is an amplified actuator of the type described in:

"A new amplifier piezoelectric actuator for precise positioning and semi-passive damping", R. Le Letty, F. Claeyssen, G. Thomin, 2nd Space Microdynamics and Accurate Control Symposium, May 13–16, 1997, Toulouse.

In a variant, it may also advantageously be of the type described in the Applicants' French patent applications filed under the numbers 97/12774 and 97/12775.

As shown in FIG. 2, the motors 1 and 2 are controlled by an electronic circuit 5 which manages control of said motors 1 and 2 as a function firstly of a flight set point and secondly of data supplied by two detectors 6 and 7.

Detector 6 is an angle detector which provides the controlling electronic circuit 5 with information concerning the absolute position of the control surface or of the attachment structure 4.

The detector 7 is also an angle detector, and it provides the controlling electronic circuit 5 with information concerning relative rotation between the shaft 3 and the structure 4.

A diagram of a possible control circuit for the motors 1 and 2 is given in FIG. 3.

The amplified actuator constituted by the motor 2 is controlled by a servo-control loop 8 designed to maintain the position of the control surface on the external set point.

This loop 8 includes, in particular, the detector 6, subtraction means 9 for generating an error signal from the set point signal and the signal output by the detector 6, means 10 for generating a correction signal based on the error signal, and an interface 11 which controls the motor 2 as a function of the correction signal.

The motor 1 is subjected to speed control in application of an non-linear control law.

For this purpose, the controlling electronic circuit 5 as shown in FIG. 3 has processor means 12 which apply said control law to generate a motor control signal as a function of the output from the detector 7. The electronic circuit 5 also has an interface 13 for controlling the motor 1 as a function of said signal.

Figure 4:
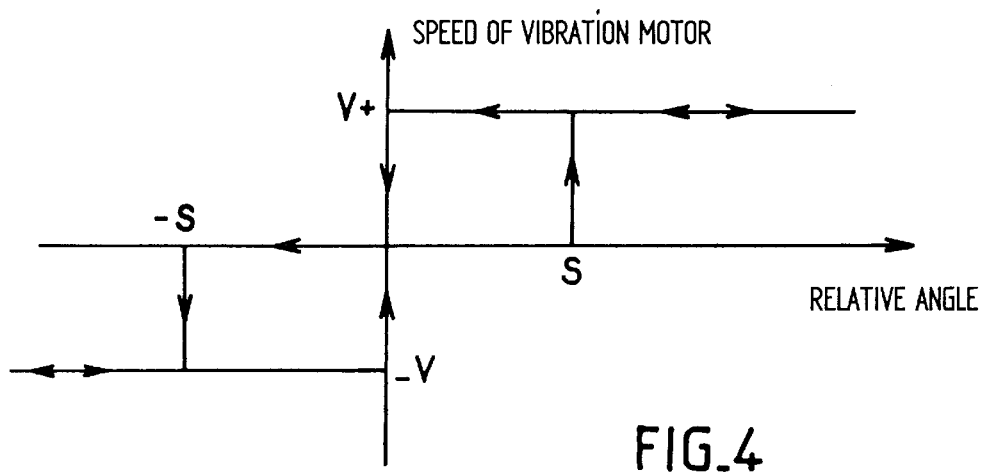
FIG. 4 is a graph on which the control law of the vibration motor of the FIG. 1 actuator is plotted.

By way of example, the non-linear control law is of the type shown in FIG. 4.

So long as the angle measured by the detector 7 is smaller than a given threshold S, the motor 2 is not caused to rotate.

In contrast, when the absolute value of the measured angle exceeds the threshold S, then the motor 1 is caused to rotate at a speed ±V in the same direction as the relative angle measured by the detector 7.

Rotation of the motor 1 is stopped when the relative angle becomes zero.

An example of an operating sequence is shown in FIGS. 5a to 5d.

Figure 5A:
FIGS. 5a to 5d are timing diagrams showing an actuator control sequence.
Figure 5B:
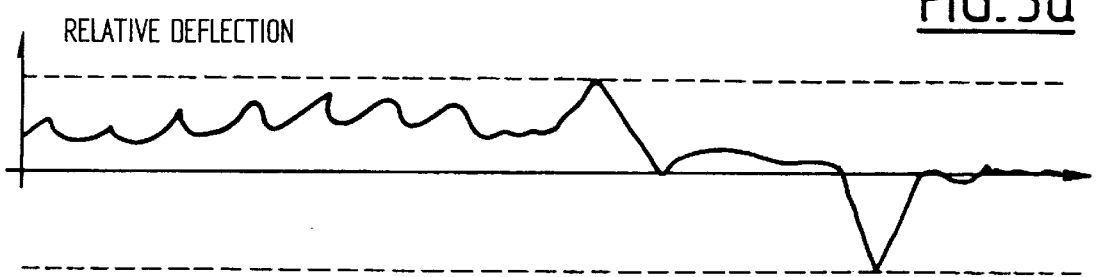
Figure 5C:
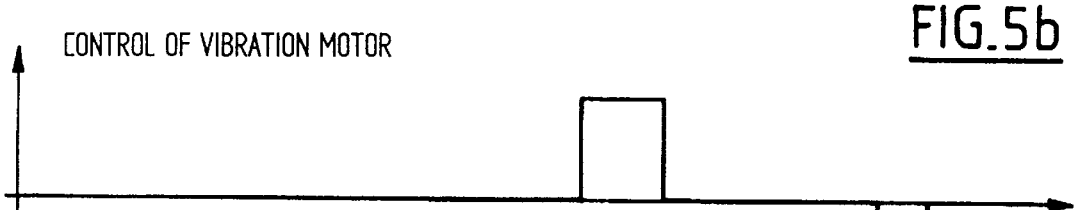
Figure 5D:
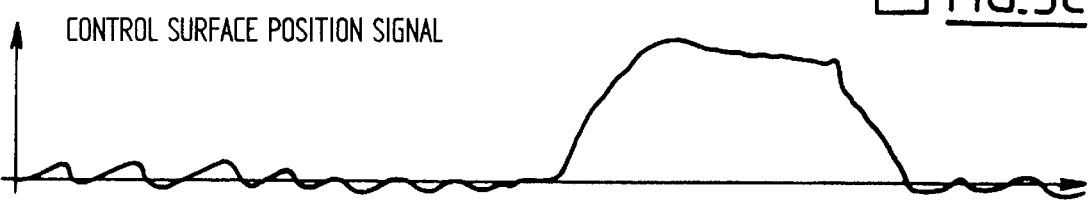

FIGS. 5a and 5d show respectively the set point signal and the signal measuring the position of the control surface.

FIG. 5b shows the signal representing the relative deflection between the control surface and the motor 2.

FIG. 5c shows the control signal applied to the motor 1 by the non-linear control means.

Advantageously, the outlet from the means 12 which implement the non-linear processing is connected to a filter (not shown) in order to limit the frequency content of the control signal applied to the motor 1.

Such a filter serves to avoid disturbing the main loop which controls the amplified actuator.

To compensate for the control delays that such a filter could cause, means can be provided upstream from the means 12 to introduce anticipated control of the motor 1.

The controlling electronic circuit 5 described above can be implemented by means of analog circuits; it can also be constituted by a computer implementing digital processing. Under such circumstances, the controlling electronic circuit 5 can be integrated in the flight computer of the aircraft.

The servo-control loops can also include optimization techniques that are conventional in automation so as to improve the performance of the system.

Other variant embodiments are naturally possible.

Figure 6:
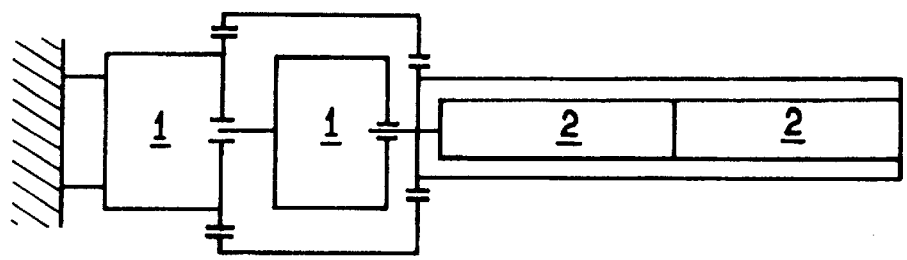
FIG. 6 is a diagram similar to FIG. 1 showing another possible embodiment of the invention.

In particular, as shown in FIG. 6, it is possible to put a plurality of vibration motors 1 and a plurality of direct actuator type motors 2 in series.

What is claimed is:

1. An actuator for a primary control surface of an air-craft, the actuator comprising at least one motor of the vibration type mounted in series with at least a second motor which is a piezoelectric, electrostrictive, or magnetostrictive actuator of the direct type, and further including control means causing one or both of the motors to operate in such a manner that the second motor drives movements of the control surface of the type used for stabilizing the aircraft, while the vibration drives movements of greater amplitude.

2. An actuator according to claim 1, wherein the control means comprise an electronic circuit controlling both of the motors as a function firstly of an external set point signal and secondly of signals output by two detectors, one providing information concerning the position of the control surface, and the other providing information concerning the relative angular position between the outlets of the two motors mounted in series.

3. An actuator according to claim 2, wherein the motor is an actuator of the direct type and is controlled by a servo-control loop designed to maintain the position of the control surface on the flight set point.

4. An actuator according to claim 2, wherein the control means apply speed control to the vibration motor as a function of the relative angle between the outlets of the two motors and in application of a non-linear control law.

5. An actuator according to claim 4, wherein the control law is such that:

the vibration motor is not caused to rotate so long as said relative angle is less than a given threshold;

the motor is caused to rotate at a given speed when the absolute value of said relative angle exceeds the threshold; and rotation of the motor is stopped when said relative angle becomes zero.

6. An actuator according to claim 4, further including filter means at the outlet of the non-linear control.

7. An actuator according to claim 1, comprising a plurality of vibration motors and a plurality of direct type motors in series.

* * * * *